(12) United States Patent
Desai et al.

(10) Patent No.: US 11,164,108 B2
(45) Date of Patent: Nov. 2, 2021

(54) TRANSFER LEARNING WITHOUT LOCAL DATA EXPORT IN MULTI-NODE MACHINE LEARNING

(71) Applicant: International Business Machines Corporation, Armonk, NY (US)

(72) Inventors: Nirmit V. Desai, Yorktown Heights, NY (US); Kelvin Kakugawa, San Francisco, CA (US); Carmelo I. Uria, Boise, ID (US); Wendy Chong, Yorktown Heights, NY (US); Steven E. Millman, Spring Valley, NY (US); Shahrokh Daijavad, Morgan Hill, CA (US); Heather D. Achilles, Gilmanton, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 867 days.

(21) Appl. No.: 15/957,970

(22) Filed: Apr. 20, 2018

(65) Prior Publication Data
US 2019/0325350 A1   Oct. 24, 2019

(51) Int. Cl.
G06N 20/00 (2019.01)
G06F 16/28 (2019.01)

(52) U.S. Cl.
CPC ........... *G06N 20/00* (2019.01); *G06F 16/285* (2019.01)

(58) Field of Classification Search
None
See application file for complete search history.

(56) References Cited

U.S. PATENT DOCUMENTS 9,680,766 B2   6/2017 El Gamal et al.
2015/0235143 A1   2/2015 Eder

OTHER PUBLICATIONS

Peteiro-Barral et al. A survey of methods for distributed machine learning, 2013, Prog Artif Intell, pp. 1-11 (Year: 2013).*

Sakhavi et al.; Convolutional Neural Network-based Transfer Learning and Knowledge Distillation using Multi-Subject Data in Motor Imagery BCI, 8th International IEEE Embs Conference on Neural Engineering, Shanghai, China, May 25-28, 2017.

Ravi, D. et al.; Deep Learning for Health Informatics, Jan. 2017.

(Continued)

*Primary Examiner* — David R Vincent
(74) *Attorney, Agent, or Firm* — Garg Law Firm, PLLC; Rakesh Garg; Joseph Petrokaitis

(57) ABSTRACT

A trained base model is distributed to a set of nodes. From a first node in the set of nodes, a first set of meta-metrics resulting from a transfer learning operation on the trained base model at the first node is collected. The transfer learning at the first node uses first local data available at the first node. The first node is clustered in a cluster with a second node from the set of nodes, in response to a meta-metric in the first set of meta-metrics being within a tolerance value of a corresponding meta-metric in a second set of meta-metrics collected from the second node. A normalized set of model parameters is constructed after an iteration of transfer learning or local learning at the first and second nodes. The normalized set of model parameters is distributed to the first node and the second node in the cluster.

20 Claims, 8 Drawing Sheets

(56) References Cited

OTHER PUBLICATIONS

Bax, E. et al.; Method and System for Validating Collective Classification using Cohorts, Jun. 18, 2014.
Anonymously; Machine-Learning for Optimization of Software Parameters, Dec. 13, 2017.
Anonymously; Identifying Sources of a Change in Metrics of a Stack of Servers, Dec. 15, 2017.

* cited by examiner

TRANSFER LEARNING WITHOUT LOCAL DATA EXPORT IN MULTI-NODE MACHINE LEARNING

TECHNICAL FIELD

The present invention relates generally to a method, system, and computer program product for training algorithms operating in data processing systems and software applications via machine learning. More particularly, the present invention relates to a method, system, and computer program product for machine learning using transfer learning in a distributed configuration of multiple nodes.

BACKGROUND

Algorithms are implemented in data processing systems and software applications to cause those systems or applications to perform certain functions. For some functions, the implementation of an algorithm is explicitly programmed to perform those functions.

Many systems and applications operate in environments where the operations, functions, or machine responses are either not foreseeable or are too numerous to be able to specifically program those operations, functions, or responses. Machine learning is a methodology by which an algorithm operating within a data processing system or a software application can be trained for providing appropriate operations, functions, or responses while operating in an environment by using data from that environment or a similar environment.

An algorithm or an implementation of an algorithm, which can be trained via machine learning is referred to herein as a model. As one of many possible examples, a neural network can be regarded as an example model, which can be trained using machine learning. In machine learning of a neural network, the neural network is trained using data inputs and known correct outputs from a given environment (domain) to produce outputs that match the correct outputs within acceptable tolerance for that domain. The training of a neural network involves, among other things, adjustment of weights associated with the nodes in the layers of the neural network such that the adjusted weights cause the neural network to produce a desirable output for a domain given input data from the domain.

Neural networks and many other types of algorithms and implementations are similarly trained using machine learning. Some practical implementations of machine learning involve driverless vehicles and other autonomous machines, applications for diagnosing diseases, systems for forecasting weather and other phenomena, applications for predicting stock market changes or outcomes of sporting events, tools for predictive management of personal health conditions, and many other applications of artificial intelligence.

A domain of a model represents key characteristics of the environment in which the data to train the model is generated. One such characteristic of a domain is a probability distribution of the training data used to train the model. Typically, a model's output in a deployment configuration is most accurate when its input comes from the same domain as the domain of the training data in the training configuration. For example, a model trained with data from consumer vehicles of a certain manufacturer make and model operating in a geographical region, such as a particular city, will perform the best when applied to vehicles and regions similar to those corresponding to the training data.

When a model trained with data from domain A is used for generating output based on input data from domain B, the outputs may not be accurate within a desired level of accuracy. Adapting a model to a new domain is referred to as "transfer learning". For example, recognizing objects from videos captured by two cameras, one observing moving vehicles and another observing people on the sidewalk, requires two separate models, one for each domain. Alternatively, a presently available transfer learning technique can be applied to adapt the model for one of the domains to another.

In a similar manner, a model that is trained to manage a particular user's personal health performs the best when trained with data obtained from or about that user. Data from different users will thus belong to different domains and models trained from different users' data can have significantly different outputs for a given input. Here, the characteristics of the input data of a particular user represents the domain for the model.

Some characteristics of multiple domains may overlap and there may not be well-defined boundaries among domains. Presently, when a new user or a node participates in a machine learning application, its domain cannot be determined without analyzing samples of local data of the user. This limitation typically requires the node to upload or export the local data that is available at the node to a training system. Local data is the data that is available at the node where the model is deployed and not at a training system where the model is trained.

Domains may also form hierarchies, with each layer of the hierarchy acting as a specialization of the higher layer. Lastly, there may be multiple ways to partition a population of users or nodes into domains or domain hierarchies based on the characteristics of the input data. The input data characteristics may further evolve over time and based on that evolution the membership of users or nodes in domains may change as well. Hence, a domain is not a pre-determined static characterization of the input data on which a model operates but is dynamically defined based on the characteristics presented by the input data.

SUMMARY

The illustrative embodiments provide a method, system, and computer program product. An embodiment includes a method that distributes a trained base model to a set of nodes. The embodiment collects from a first node in the set of nodes, a first set of meta-metrics resulting from a transfer learning operation on the trained base model at the first node, the transfer learning at the first node using first local data available at the first node. The embodiment clusters, in a cluster, the first node with a second node from the set of nodes, responsive to a meta-metric in the first set of meta-metrics being within a tolerance value of a corresponding meta-metric in a second set of meta-metrics collected from the second node. The embodiment constructs a normalized set of model parameters after an iteration of one of (i) transfer learning and (ii) local training at the first node and the second node. The embodiment distributes the normalized set of model parameters to the first node and the second node in the cluster.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
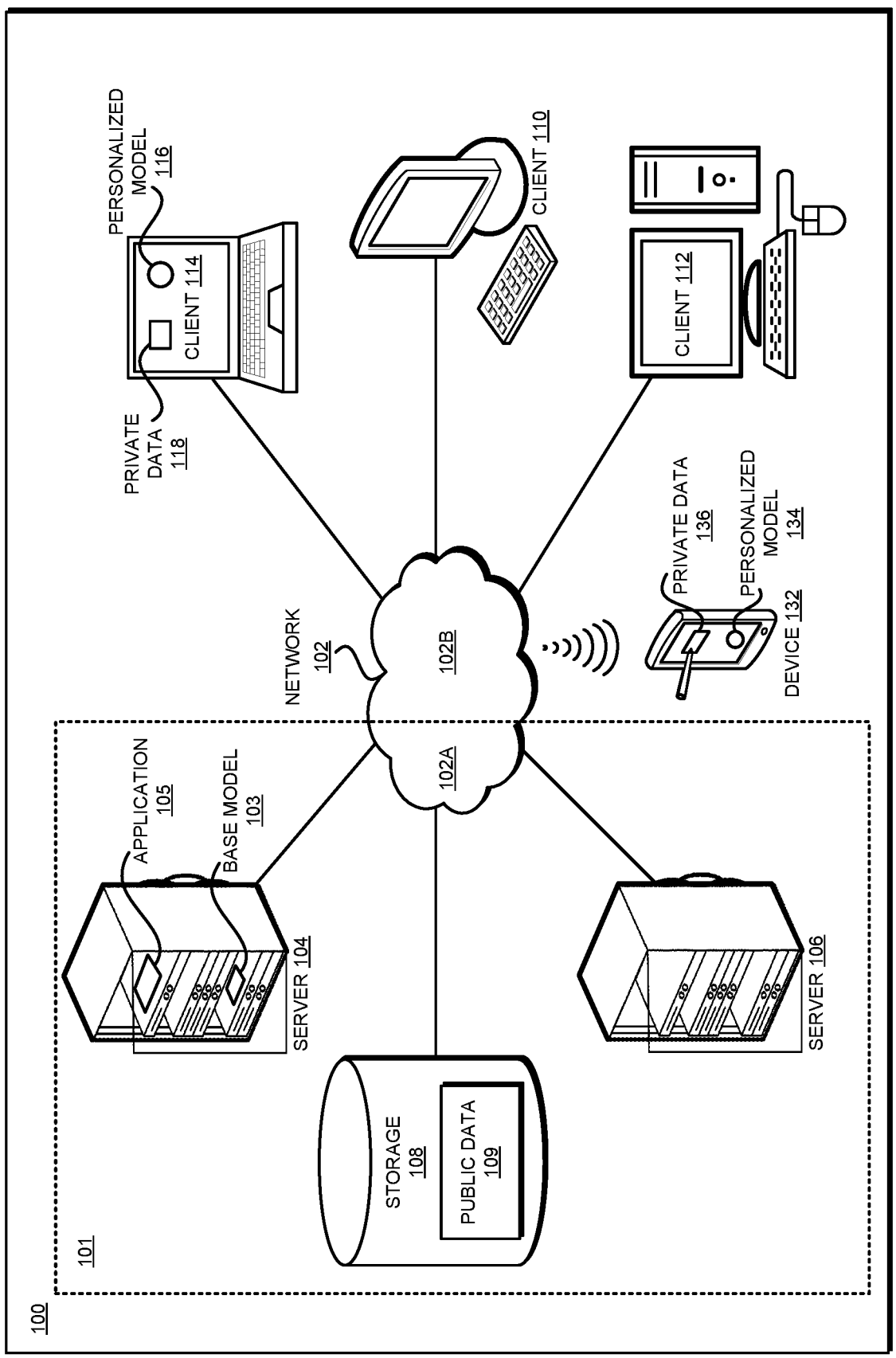
FIG. 1 depicts a block diagram of a network of data processing systems in which illustrative embodiments may be implemented.

Machine learning is a well-recognized technological field of endeavor. The present state of the technology in this field of endeavor has certain drawbacks and limitations. The operations of the illustrative embodiments impart additional or new capabilities to improve the existing technology in the technological field of endeavor of machine learning, especially in the area of distributed learning.

The illustrative embodiments recognize that presently, when different instances of a model have to be trained for different domains, the data from that domain has to be exported from the client systems, or nodes, to the training system. The model is trained in the training system and the trained model is then deployed to the nodes.

Often, the training systems and the systems from where the models are deployed to the nodes across various domains are server-side systems. Implementing server-side systems in a cloud architecture is a common occurrence. A number of nodes as well as the server-side systems operate on a network. The network may be a private network, connecting to other external systems via appropriate gateways, networks pathways, and protocols.

Only for the clarity of the disclosure and without implying any limitation thereto, an assumption is made that the training system is a server in a cloud. It is possible for a node to obtain the model from another node, but in such a case, the node that delivers the model is also regarded simply as a server. Presently, a node downloads or otherwise obtains a model from a server in the cloud. The node operates the model in its local environment. Any reference herein to a training system, a server-side system or environment, cloud, or some combination thereof is understood to be inclusive of a node that can be interpreted as server stand-in to supply another node with a model.

The node may determine that the model is not suitable to its local environment, i.e., for the domain according to characteristics of the local data available at the node. To train a model specifically for its domain, the node has to upload or otherwise provide local domain-specific data to the server in the cloud.

Again, only for the clarity of the disclosure and without implying any limitation thereto, an assumption is made that the local data is exported to a server in a cloud. It is possible for a node to export the local data to another node, but in such a case, the node that receives the exported data (and may also be capable of training a model for another node using the exported data) is also regarded as simply a server. The common issue with a server in a cloud or another node behaving as a training system is that a node in question has to export its local data to such a training system for the training system to train a model for the node in question. Any reference herein to a training system, a server-side system or environment, cloud, or some combination thereof is understood to be inclusive of a node that can be interpreted as server stand-in that receives exported local data from another node in the prior-art.

The training system trains the model using the exported local data to create a domain-specific version of the model. The training system provides the domain-specific model to the node that exported the local data.

The illustrative embodiments recognize that local data may be private or otherwise limited from being exported from the node. For example, a business enterprise may not wish to export their local data due to security concerns; or a user may not wish to upload their local data due to privacy concerns. Other concerns with leveraging a cloud for training domain-specific models may include the costs involved in renting the cloud server or the latencies involved in communicating with the cloud servers. Generally, local data (hereinafter interchangeably referred to as "local data" or "private data") may be subject to various limitations, which either prohibit or render undesirable the exporting of the local data outside the node.

Presently, to train and use a domain-specific model, the privacy of the local data has to be compromised as the local data has to be shared with the training system for training of the domain-specific model. Without such sharing, a node may be limited to using a generic model that has been trained using public data, i.e., using training data available at the training system. The public data may not even be available, may be generic and not aligned with any particular domain, and may or may not be relevant to the domain of the node in question.

The present state of the technological field of endeavor of distributed machine learning does not include a mechanism, other than exporting local data to a model training system, to train domain-specific models from data collected from several nodes and belonging to multiple domains. A need exists to keep local data private within the node without exporting to the training system, while still being able to train domain-specific models. Such domain-specific training should benefit from not only the local data of one node but also the local data of other nodes belonging to same or similar dynamically determined domains, all while maintaining the privacy of local data residing on each node. A need exists that when a domain's characteristics change, a model is re-trained to correspond to the changed characteristics. A need exists that a generic model be improved or adjusted based on the evolution seen in the domain-specific models without compromising the privacy of any node's local data.

The illustrative embodiments recognize that the presently available tools or solutions do not address these needs/problems or provide adequate solutions for these needs/problems. The illustrative embodiments used to describe the invention generally address and solve the above-described problems and other related problems by transfer learning from local data of one or more nodes where the data cannot be exported out of the nodes.

An embodiment can be implemented as a combination of certain hardware components and a software application. An implementation of an embodiment, or one or more components thereof, can be configured as a modification of an existing server-side distributed learning-capable model training system, with a companion software application executing in some combination of (i) the model training system itself, (ii) a data processing system communicating with the model training system over short-range radio or a local area network (LAN), and (iii) a data processing system communicating with the model training system over a wide area network (WAN).

A base model is a model that is trained with public data, which is obtained and normalized from multiple domains, and is not domain-specific. A trained base model is a base model that has been trained at the training system using public data. Unless expressly distinguished where used, the training system is located on the server-side. A personalized model is a domain-specific model that has been trained at a node using local data of the node. Unless expressly distinguished where used, a node is a client-side data processing system.

A meta-metric is information about how much a personalized model is digressing from the base model. For example, a node can compute a meta-metric for a personalized model where the meta-metric is a value of a divergence of one characteristic of the personalized model relative to the same characteristic of the base model. One example of a meta-metric is a difference between a probability distribution of inputs presented to the personalized model and a probability distribution of inputs presented to the base model. For instance, the meta-metric may be the difference between probability of inputs being human faces in a node's imaging platform versus the probability of the inputs being human faces in the public data during base model training. Another example of a meta-metric is a difference between a weight of a certain neural network node in the personalized model and the weight of that neural network node in the base model.

These examples of meta-metrics are not intended to be limiting. From this disclosure, those of ordinary skill in the art will be able to conceive many other meta-metrics and the same are contemplated within the scope of the illustrative embodiments.

A model parameter is a value associated with a characteristic of a model. For example, if the model is a neural network, the model parameters may be a set of weights corresponding to a set of neural network nodes in the model. As another example, if the model is a different type of algorithm, a set of model parameters may be set of constants, variables, or some combination thereof, used in one or more functions or computations in the algorithm.

An embodiment trains a base model using public data in a training system. The embodiment distributes the trained base model to a set of nodes. It is not necessary to know a priori the association of specific nodes with domains. The domains may not even be defined and may be discovered later in the distributed transfer learning procedures described in this disclosure.

Any operation described herein as occurring at or performed by the node can be implemented in such a manner that a server-side function, or a function implemented in a system other than the node, causes the operation to occur at the node or be performed at the node without the use of any special configuration of the node. Therefore, any recitation of a node performing an operation should not be construed as a client-side limitation on the illustrative embodiments. Similarly, a node may act autonomously in carrying out certain operations without any explicit communication with the server-side system, or with other nodes. Therefore, any recitation of a server-side/external function instructing a node to perform an operation should not be construed as a requirement of the illustrative embodiments.

A node receives a trained base model. The node performs transfer learning locally on the trained base model with local data of the node. Transfer learning is the process of adapting a trained model to a new domain with data from the new domain. In the transfer learning at the node, the node uses the local data available to the node. No local data is exported or communicated from the node to the training system or other nodes. The transfer learning produces a personalized model at the node. The node computes a set of meta-metrics using the trained base model that was initially received at the node and the personalized model that is now available at the node. The node transmits the set of meta-metrics to the training system.

An embodiment at the training system receives meta-metrics from at least some of the nodes, and preferably the complete set of nodes. Using the meta-metrics, the embodiment determines that a subset of the nodes has at least one meta-metric whose value is same or similar within a tolerance for all nodes within the subset. The embodiment groups the nodes in such a subset into one cluster. This cluster represents a discovered domain that is now defined by the common meta-metrics.

A cluster may be based on one or more meta-metrics whose values are similar within the cluster. Any number of clusters can be formed in this manner. Different clusters have different sets of meta-metrics in which similarities exist (hereinafter referred to as cluster meta-metrics), but different clusters can have overlaps in such sets of meta-metrics. A node can belong to more than one clusters, but preferably belongs uniquely to a single cluster. The training system may employ any of the existing clustering algorithms such as k-means, hierarchical clustering, Gaussian mixture models, EM clustering, or any other algorithm that aims to group similar data points in one cluster while placing different data points in different clusters.

After the clusters have been formed, the next operation can occur in two alternative ways. According to a first method (hereinafter referred to as the "cluster notification method"), an embodiment causes the training system to simply notify a node about the node's participation in a particular cluster. The node that receives the notification starts participating in a distributed learning process wherein a domain-specific model for the given cluster is trained using local data residing on all nodes of the cluster, without exporting the local data from any of the nodes.

According to a second method (hereinafter referred to as the "cluster model method"), for a cluster, another embodiment constructs a version of the trained base model in which one or more model parameters are adjusted according to the cluster meta-metrics of that cluster. For example, if one cluster is formed to include those cameras that are observing people, the version of the base model can be selectively trained with more people-related inputs from the public data; and if another cluster is formed to include those cameras that are observing vehicular traffic, another version of the base model can be selectively trained with more vehicle-related inputs from the public data.

Such selective training in the cluster model method will result in one cluster-specific trained base model corresponding to each cluster. A cluster-specific trained base model is now benefiting from the transfer learning applied at the nodes without actually requiring the export of the local data to the training system. Furthermore, the cluster-specific trained base model allows one node in the cluster to benefit from the transfer learning applied by another node, which may or may not bear any relation to first node on the client-side, and again, without exporting either node's local data to the other node or the training system. For example, a smartphone of one asthma patient may be one node, that may be clustered with another node—a tablet computer of another patient suffering from pollen allergy, if both nodes report similarly heightened sensitivity to pollen as a meta-metric for a model that provides health-related environmental condition alerts. Neither patient might know about the other, but may benefit from each other's transfer learning.

Optionally, in conjunction with the first or the second method, an embodiment also adjusts the base model based on the meta-metrics received from one or more nodes in one or more clusters. For example, if initially, the public data included a mix of human faces, vehicles, and landscape features in the training inputs for training an image processing model for cameras, and if very few or none of the nodes indicated that their models were looking at landscape features, the embodiment may selectively remove the landscape-related inputs to modify the base model for the given population of nodes where the model is distributed.

In the cluster notification method, an embodiment sends a cluster participation notification to the nodes in a cluster. In the cluster model method, an embodiment sends, transmits, or otherwise distributes a cluster-specific trained base model to the nodes in the cluster.

In both the cluster notification method as well as the cluster model method, a node splits its local data into many subsets, called batches, and begins an iterative process of distributed learning. Volume of local data available for training as well as the size of a batch may vary from one node to another. One instance of the iterative process is initiated for each cluster. The iterative process can include zero or more iterations. The iterative process stops when an exit condition is satisfied.

In one embodiment, in the cluster notification method, a node in each cluster initializes a new local personalized model with any randomly chosen model parameters. In one embodiment, in the cluster model method, a node in each cluster creates a new local personalized model by performing transfer learning using one batch of local data available at the node on the cluster-specific trained base model received at the node.

The remainder of the iterative process described herein is applicable to the cluster notification method as well as the cluster model method. A node in a cluster performs the following steps in each iteration of distributed learning.

First, a node performs an iteration of model training on the local personalized model using one batch of the local data. Next, a node computes, collects, or otherwise obtains a set of model parameters of the resulting local personalized model. The node sends, transmits, or otherwise provides the model parameters to a training system.

Upon receiving one or more reports of model parameters from nodes of a cluster, the training system aggregates or normalizes using a suitable function (collectively referred to hereinafter as "normalization" or a variant thereof) a model parameter across all such node-specific reports. For example, if model parameter X has value 1.0 from one node report, 1.12 in another node report, 0.96 in another node report, 1.25 in another node report and 1.31 in another node report in the cluster, one example normalization may be to take a statistical average of the parameter values to yield a normalized parameter value of (0.96+1.0+1.12+1.25+1.31)/5=1.128. This example method of normalization is not intended to be limiting. From this disclosure, those of ordinary skill in the art will be able to conceive many other ways to normalize more than one values into a single value, such as by using standard deviation, maximum, minimum, a mathematical function of multiple values, or other computation methods, and the same are contemplated within the scope of the illustrative embodiments. The embodiment similarly normalizes all or some of the model parameters for a cluster, resulting in a cluster-specific normalized set of model parameters.

Next, the training system notifies all participating nodes in a cluster of the normalized model parameters. Upon receiving the normalized model parameters, a node in a cluster updates the parameters of its local personalized model to match the received model parameters. This concludes an iteration of distributed learning. If an exit condition is satisfied, an embodiment stops further collection of model parameters from the nodes and the nodes proceed with the personalized model resulting from their respective previous iterations.

In the iterative process described herein, the parameter values are expected to converge after some number of iterations. Accordingly, an exit condition may be that for a cluster, at least one model parameter has values in the various sets of model parameters received from the participant nodes, where those values are within a tolerance value of each other. One or more parameters may converge within their respective tolerances in this manner, and the exit condition may be satisfied when one or more parameters have converged.

Another example exit condition may be when a certain number of iterations have been performed. Another example exit condition may be that the number of participant nodes in the cluster has reduced below a threshold number of nodes.

These examples of exit conditions are not intended to be limiting. From this disclosure, those of ordinary skill in the art will be able to conceive many other exit conditions and the same are contemplated within the scope of the illustrative embodiments.

During the iterative distributed learning process described herein, the composition of a cluster can change. For example, a node can become active and exhibit characteristics similar to a cluster, causing an embodiment to join the node to the existing cluster. As another example, a node might become inactive, causing an embodiment to remove the node from the existing cluster. As another example, a node can change its behavior and begin exhibiting characteristics similar to a different cluster, causing an embodiment to remove the node from its original cluster and join the node to the other cluster.

At any iteration, an embodiment can also optionally improve or adjust the base model in a manner described herein. The adjustment may be based on the meta-metrics and/or model parameters learned during one or more iterations of the distributed learning process.

The manner of transfer learning without local data export described herein is unavailable in the presently available methods in the technological field of endeavor pertaining to machine training of distributed models. A method of an embodiment described herein, when implemented to execute on a device or data processing system, comprises substantial advancement of the functionality of that device or data processing system in being able to train a domain-specific model without requiring a node in the domain to transfer local data to a server-side training system, yet still obtain a personalized model that has been trained using the local data of several other nodes.

The illustrative embodiments are described with respect to certain types of models, nodes, meta-metrics, model parameters, training systems, locations of embodiments, public data and local data, exit conditions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
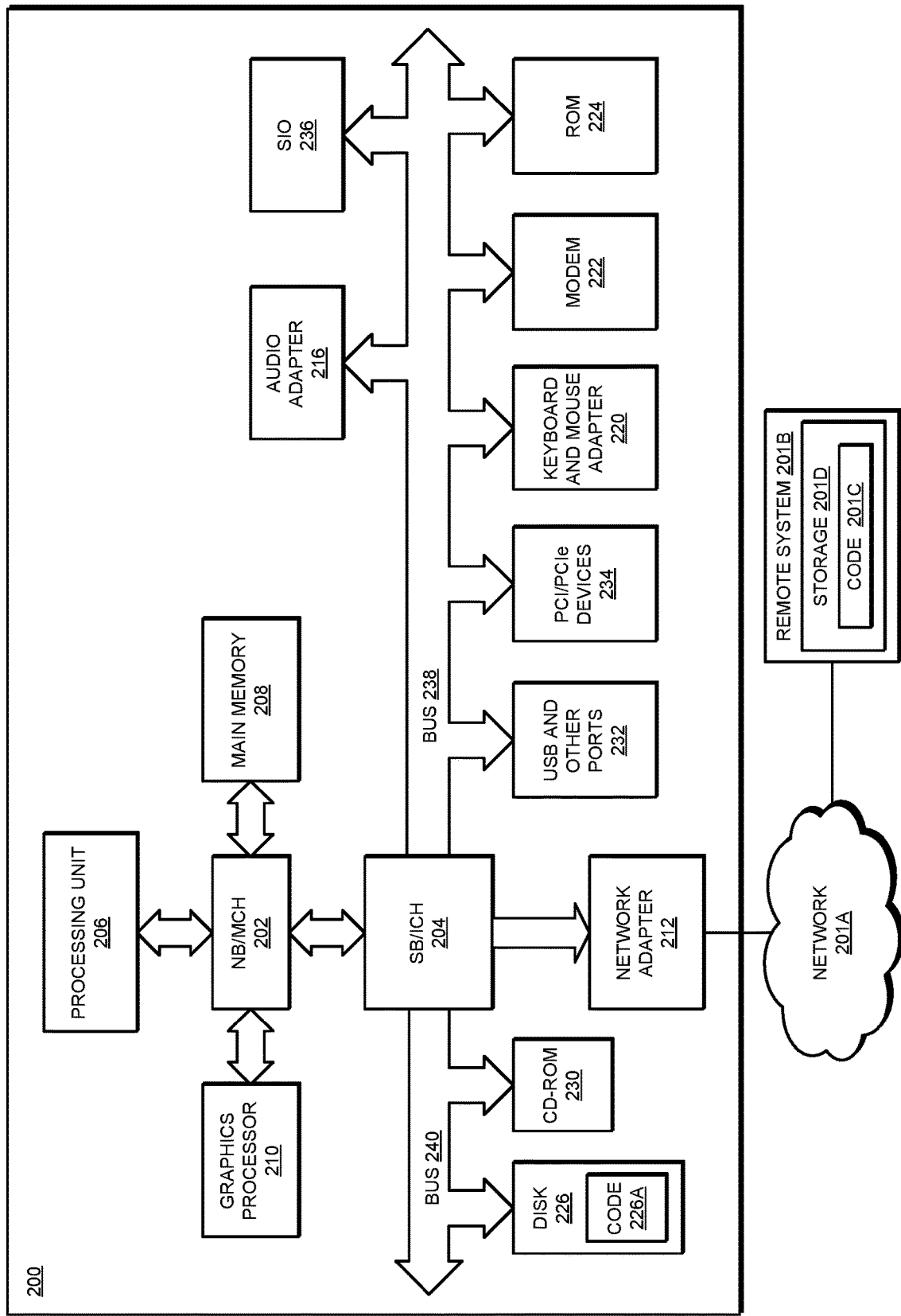
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

In a server-side and client-side setup contemplated in the illustrative embodiments, network 102 comprises network portions 102A and 102B. Assume that the server-side environment 101 includes server 104 and storage 108 including public data 109, and perhaps other data processing systems. In a non-limiting example, server-side environment 101 may be a cloud infrastructure and network portion 102A may be the network inside the cloud. Network portion 102A connects with client-side via network portion 102B.

Application 105 implements an embodiment described herein. Application 105 trains base model 103 using public data 109 and delivers trained base model to nodes such as device 132 and client 114. Application 105 causes node 132 to perform transfer learning to produce personalized model 134 using local data 136. Similarly, Application 105 causes node 114 to perform transfer learning to produce personalized model 116 using local data 118. Application 105 obtains meta-metrics and model parameters from nodes 132 and 114, forms clusters, and provides normalized cluster-specific normalized set of model parameters to nodes 132 and 114 in an iterative distributed learning process as described herein. In one embodiment, application 105 delivers program code to nodes 132 and 114, which causes nodes 132 and 114 to perform the operations described herein. In another embodiment, application 105 delivers commands to nodes 132 and 114, which causes nodes 132 and 114 to perform the operations described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 can also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3A:
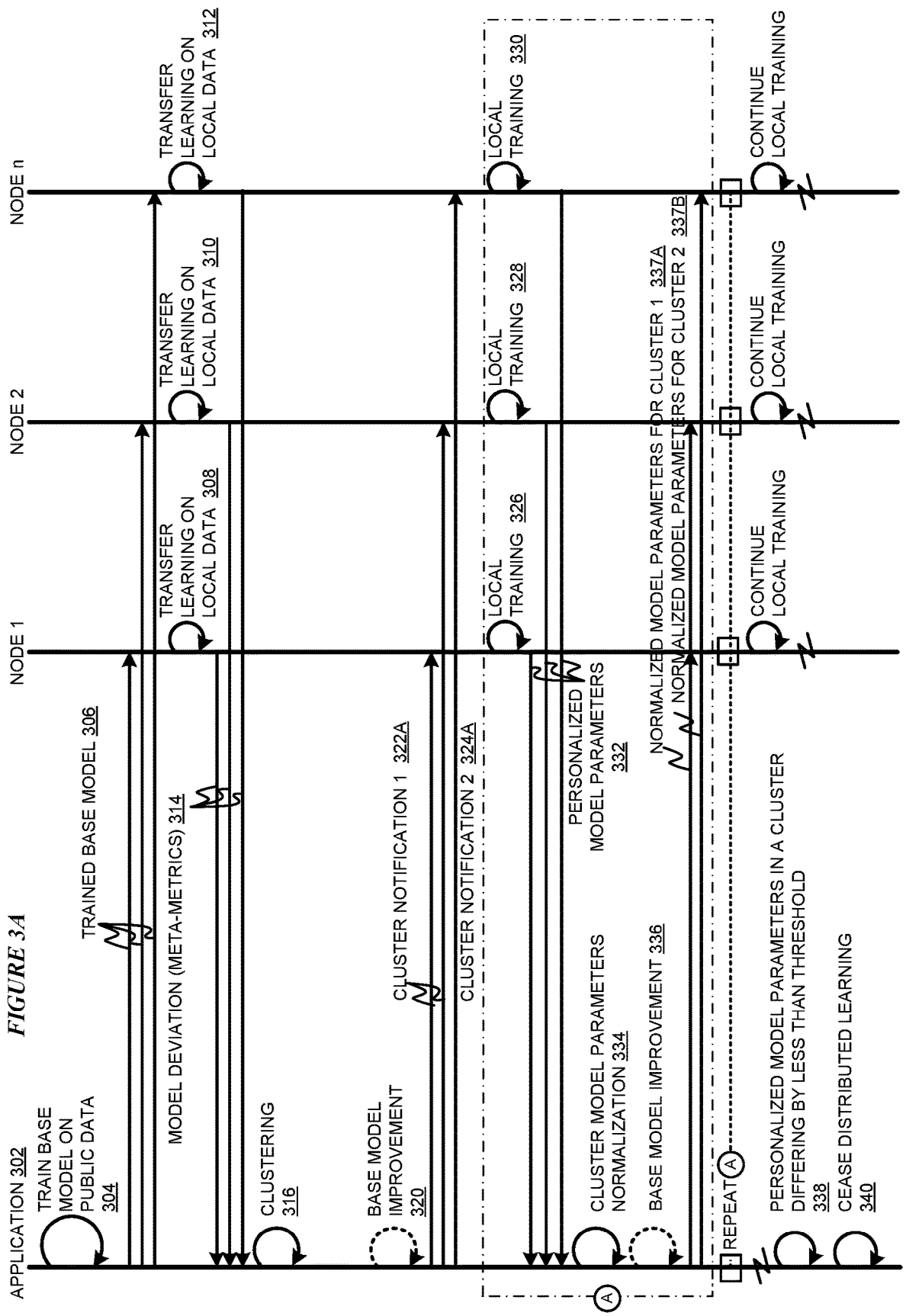
FIG. 3A depicts a sequence diagram of an example process for transfer learning without local data export under the cluster notification method in accordance with an illustrative embodiment.

With reference to FIG. 3A, this figure depicts a sequence diagram of an example process for transfer learning without local data export under the cluster notification method in accordance with an illustrative embodiment. Application 302 is an example of application 105 in FIG. 1. Node 1, node 2, . . . node n are any number of nodes participating in distributed machine learning as described herein.

Application 302 trains a base model, e.g., base model 103 in FIG. 1, using public data, e.g., public data 109 in FIG. 1 (operation 304). Application 302 deploys the trained base model at nodes 1 . . . n (operation 306).

The deployment causes a node to perform transfer learning. For example, node 1 performs transfer learning using the local data available at node 1 (operation 308), node 2 performs transfer learning using the local data available at node 2 (operation 310), and . . . node n performs transfer learning using the local data available at node n (operation 312).

Application 302 collects meta-metrics from nodes 1 . . . n (operation 314). On the meta-metrics, application 302 performs clustering (operation 316). Assume that the clustering results in nodes 1 and 2 becoming members of cluster 1 and node n becomes a member of cluster 2.

Application 302 optionally adjusts or improves the base model based on the meta-metrics of one or more clusters, as described herein (operation 320). Application 302 sends cluster notification 1 to the nodes in cluster 1, i.e., to nodes 1 and 2, (operation 322A). Cluster notification 1 is a notification that informs node 1 that node 1 has been grouped in cluster 1 and informs node 2 that node 2 has been grouped in cluster 1. Application 302 sends cluster notification 2 to the nodes in cluster 2 (operation 324A). Cluster notification 2 is a notification that informs node n that node n has been grouped in cluster 2. Sending cluster notifications to nodes can be accomplished in any suitable manner without departing from the scope of the illustrative embodiments.

The recipient nodes perform an iteration of local training using a batch of the local data to train a local personalized model. Node 1 performs local training using node 1's local data (operation 326). Node 2 performs local training using node 2's local data (operation 328). Node n performs local training using node n's local data (operation 330).

Application 302 collects model parameters of local personalized models from the participant nodes in each cluster (operation 332). Application 302 normalizes the model parameters for a cluster and produces a normalized set of model parameters for the cluster (operation 334). Application 302 sends the normalized model parameters of cluster 1 to nodes 1 and 2 (operation 337A). Application 302 sends the normalized model parameters of cluster 2 to node n (operation 337B). Node 1 updates the parameters of its local personalized model to match the normalized parameters for cluster 1 received in operation 337A. Node 2 updates the parameters of its local personalized model to match the normalized parameters for cluster 1 received in operation 337A. Node n updates the parameters of its local personalized model to match the normalized parameters for cluster 2 received in operation 337B.

Optionally, application 302 may adjust or improve the base model using one or more sets of model parameters resulting from operation 332 or 334 (operation 336).

Operations 326-337A-B form block A of operations as depicted in FIG. 3A. Block A forms an iteration of distributed machine learning. The configuration represented in FIG. 3A can repeat the operations in block A for any number of iterations until an exit condition is satisfied, as described herein. For example, if application 302 determines that the personalized model parameters collected from a cluster in any given iteration have converged within a defined convergence tolerance (operation 338), application 302 ceases the distributed machine learning iterations for that cluster or all clusters, as the case may be (operation 340).

Figure 3B:
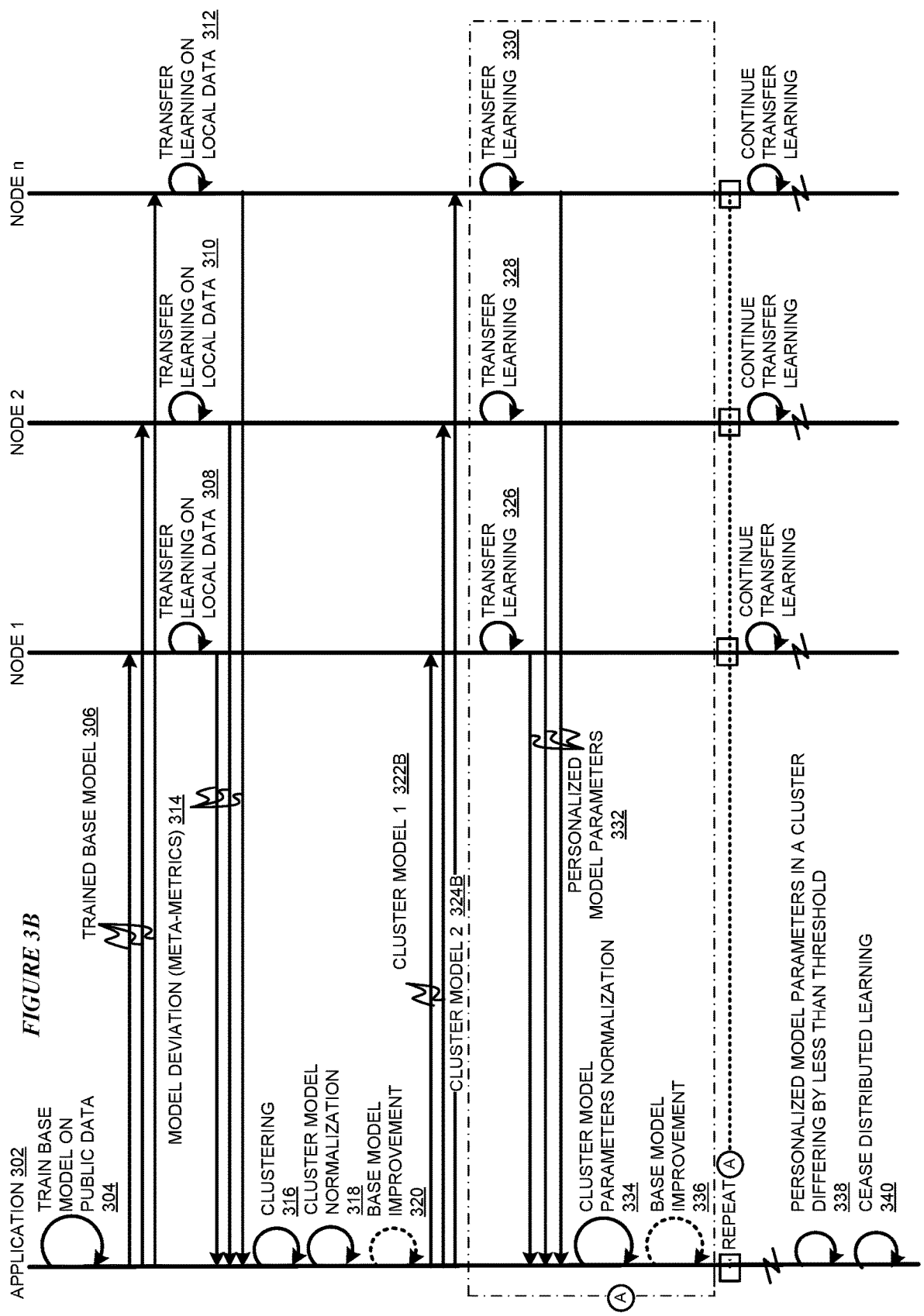
FIG. 3B depicts a sequence diagram of an example process for transfer learning without local data export under the cluster model method in accordance with an illustrative embodiment.

With reference to FIG. 3B, this figure depicts a sequence diagram of an example process for transfer learning without local data export under the cluster model method in accordance with an illustrative embodiment. Application 302 is an example of application 105 in FIG. 1. Node 1, node 2, . . . and node n are any number of nodes participating in distributed machine learning as described herein.

Application 302 trains a base model, e.g., base model 103 in FIG. 1, using public data, e.g., public data 109 in FIG. 1 (operation 304). Application 302 deploys the trained base model at nodes 1 . . . n (operation 306).

The deployment causes a node to perform transfer learning. For example, node 1 performs transfer learning using the local data available at node 1 (operation 308), node 2 performs transfer learning using the local data available at node 2 (operation 310), and . . . node n performs transfer learning using the local data available at node n (operation 312).

Application 302 collects meta-metrics from nodes 1 . . . n (operation 314). On the meta-metrics, application 302 performs clustering (operation 316). Assume that the clustering results in nodes 1 and 2 becoming members of cluster 1 and node n becomes a member of cluster 2.

Application 302 normalizes the base model for each cluster (operation 318). Application 302 optionally adjusts or improves the base model based on the meta-metrics of one or more clusters, as described herein (operation 320).

Application 302 deploys cluster model 1 to the nodes in cluster 1 (operation 322B). Cluster model 1 is a cluster-specific model for cluster 1. Application 302 deploys cluster model 2 to the nodes in cluster 2 (operation 324B). Cluster model 2 is a cluster-specific model for cluster 2. In one embodiment, deployment of cluster models to cluster nodes only involves sending new model parameter values of a cluster model to the nodes in that cluster.

The recipient nodes again perform transfer learning on the cluster-specific model. Node 1 performs transfer learning using node 1's local data on cluster model 1 (operation 326). Node 2 performs transfer learning using node 2's local data on cluster model 1 (operation 328). Node n performs transfer learning using node n's local data on cluster model 2 (operation 330).

Application 302 collects model parameters of personalized models from the participant nodes in various clusters (operation 332). Application 302 normalizes the model parameters from a cluster and produces a normalized set of model parameters for the cluster (operation 334). Optionally, application 302 may adjust or improve the base model using one or more sets of model parameters resulting from operation 332 or 334 (operation 336).

Operations 322-336 form block A of operations as depicted in FIG. 3B. Block A forms an iteration of distributed machine learning. The configuration represented in FIG. 3B can repeat the operations in block A for any number of iterations until an exit condition is satisfied, as described herein. For example, if application 302 determines that the personalized model parameters collected from a cluster in any given iteration have converged within a defined convergence tolerance (operation 338), application 302 ceases the distributed machine learning iterations for that cluster or all clusters, as the case may be (operation 340).

Figure 4:
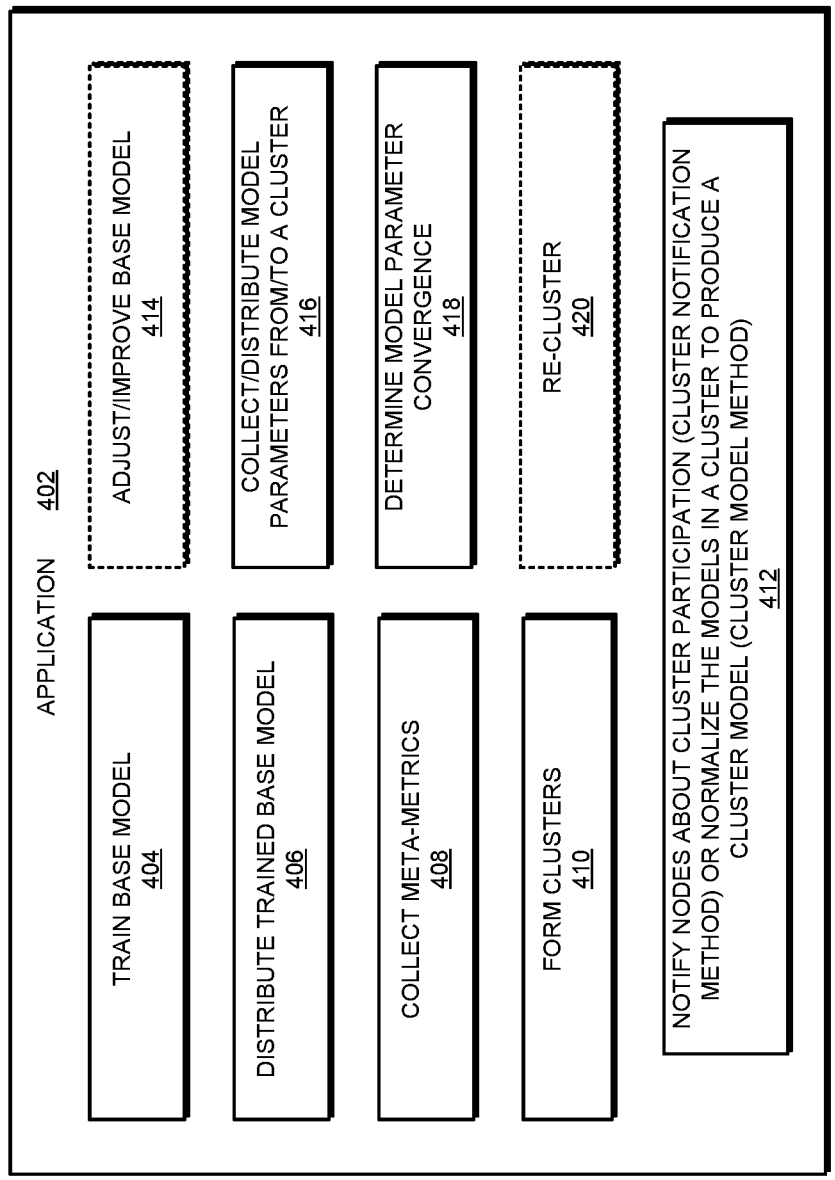
FIG. 4 depicts a block diagram of an application for transfer learning without local data export in accordance with an illustrative embodiment.

With reference to FIG. 4, this figure depicts a block diagram of an application for transfer learning without local data export in accordance with an illustrative embodiment. Application 402 is an example of application 302 in FIGS. 3A-B.

Component 404 trains a base model, as in operation 304 in FIGS. 3A-B. Component 406 distributes the trained base model to nodes participating in distributed learning, as in operation 306 in FIGS. 3A-B.

Component 408 collects meta-metrics from participating nodes, as in operation 314 in FIGS. 3A-B. Component 410 forms clusters of nodes exhibiting at least some similarity in their meta-metrics, as in operation 316 in FIGS. 3A-B.

Component 412 is configured differently depending on whether an implementation uses the cluster notification method or the cluster model method. If the implementation uses the cluster notification method, component 412 notifies a node about the cluster in which the node participates, as in operations 322A and 324A in FIG. 3A.

If the implementation uses the cluster model method, component 412 normalizes the models in a cluster to produce a cluster model, as in operation 318 in FIG. 3B. Component 412 deploys the cluster model to a cluster, as in operations 322B and 324B in FIG. 3B. Optionally, component 414 may adjust or improve the base model based on the obtained meta-metrics, as in operation 320 in FIGS. 3A-B. The deployment causes the nodes in the cluster to perform transfer learning or local training, as corresponds to the implementation method used, and produce model parameters of their respective personalized models, as in operations 326, 328, and 330.

Component 416 collects model parameters from a cluster, as in operation 332 in FIGS. 3A-B. Component 412 again engages to normalize the model parameters from a cluster to produce a normalized set of model parameters for a cluster model, as in operation 334 in FIGS. 3A-B. Again, component 414 may optionally adjust or improve the base model based on the model parameters of a cluster, as in operation 336 in FIGS. 3A-B.

Component 418 determines whether the model parameters from the nodes in a cluster satisfy an exit condition, such as convergence, as in operation 338 in FIGS. 3A-B. When the exit condition is not satisfied, component 418 normalizes the model parameters and causes component 416 to distribute the normalized model parameters to the nodes in the clusters. Component 418 causes the distributed learning to terminate at one or more clusters depending on the satisfaction of the exit condition. Component 420 optionally re-clusters the nodes, changes the participation of a node in a cluster, forms new clusters, deletes a cluster, or some combination thereof depending on the behavior of the nodes relative to the model.

Figure 5:
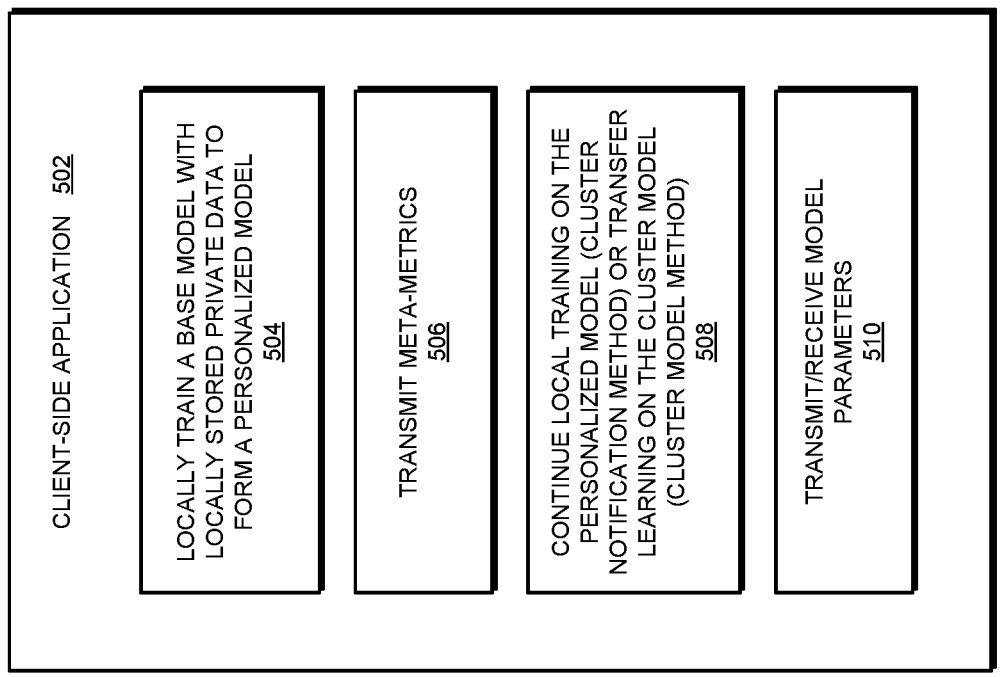
FIG. 5 depicts a block diagram of an example agent using which a node is caused to perform operations in accordance with an illustrative embodiment.

With reference to FIG. 5, this figure depicts a block diagram of an example agent using which a node is caused to perform operations in accordance with an illustrative embodiment. Application 402 of FIG. 4 may, according to one non-limiting embodiment, cause a node to perform certain operations described herein. In order to cause such operations as the node, application 402 of FIG. 4 may deliver to the node client-side application 502 in a suitable form and at a suitable time during the interactions with the node. Application 502 can also be converted into discrete commands that application 402 may cause to be performed at a node.

Component 504 performs transfer learning on a delivered base model using local data available at the node where application 502 or component 504 is executing. Component 506 collects and transmits the meta-metrics from the node to application 402 in FIG. 4.

Component 508 is configured differently depending on whether an implementation uses the cluster notification method or the cluster model method. If the implementation uses the cluster notification method, component 508 continues performing local training on the model from which the node sent the meta-metrics.

If the implementation uses the cluster model method, component 508 receives a cluster model from application 402 and performs transfer learning on the cluster model.

Component 510 collects and transmits the set of model parameters resulting from the transfer learning performed by component 508. Component 510 also receives normalized model parameters for the next iteration. The receiving of the normalized model parameters causes the updating of the local personalized model parameters before the next iteration of training with next batch of local training data.

Figure 6A:
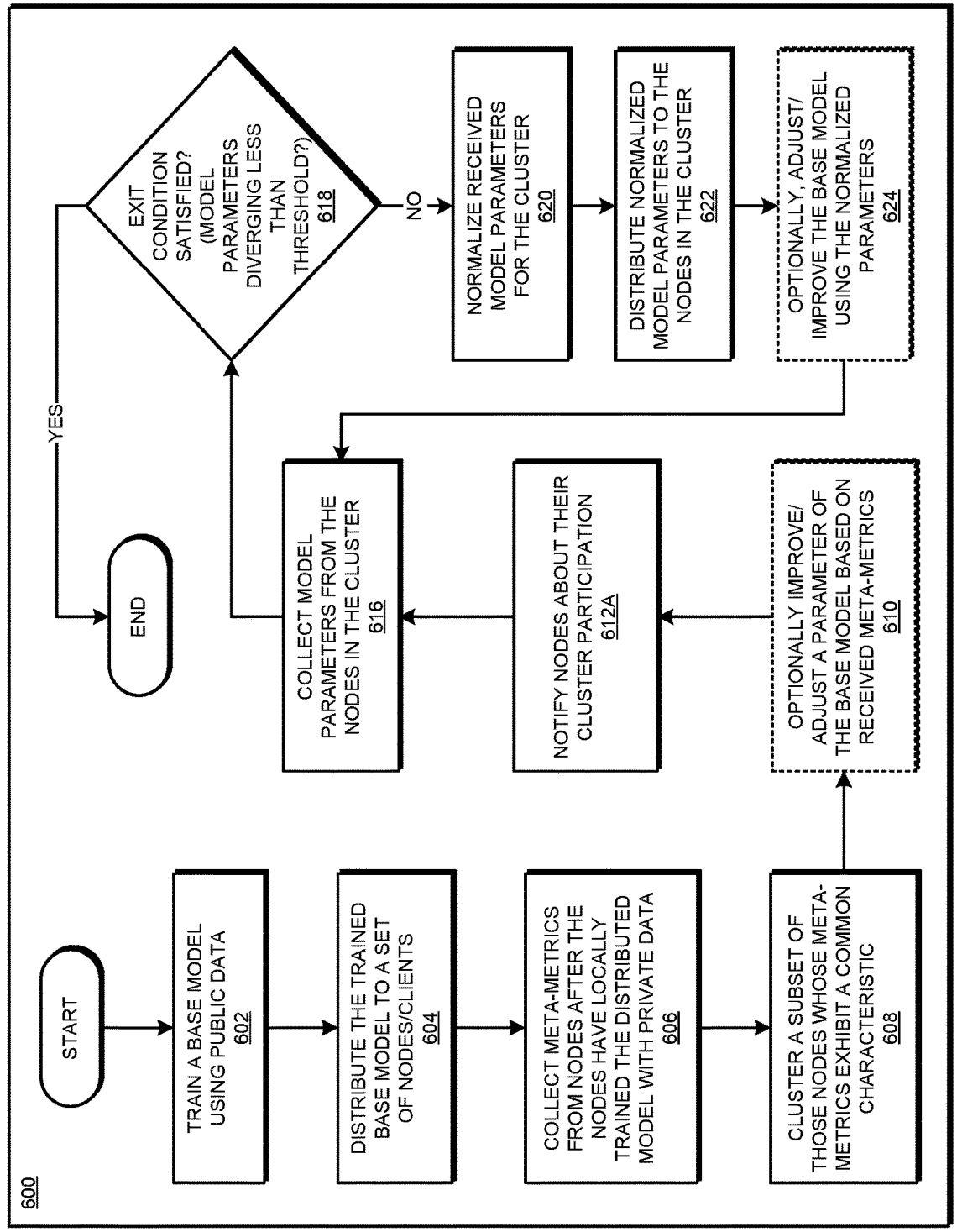
FIG. 6A depicts a flowchart of an example process for transfer learning without local data export using the cluster notification method in accordance with an illustrative embodiment.

With reference to FIG. 6A, this figure depicts a flowchart of an example process for transfer learning without local data export using the cluster notification method in accordance with an illustrative embodiment. Process 600 can be implemented using application 402 in FIG. 4.

The application trains a base model with public data (block 602). The application distributes the trained base model to a set of nodes (block 604). The application collects meta-metrics from the nodes after the nodes have locally trained the distributed base model with local data of the nodes (block 606).

The application clusters a subset of those nodes whose meta-metrics exhibit a common characteristic (block 608). The application optionally adjusts the base model based on the meta-metrics as described herein (block 610).

The application notifies the nodes about their respective cluster participation (block 612A). The application collects sets of model parameters from the nodes in the cluster (block 616). The application determines whether an exit condition has been satisfied, e.g., whether the model parameters from the nodes in the cluster have converged within a tolerance (block 618). If the exit condition has been satisfied ("Yes" path of block 618), the application ends process 600 thereafter.

If the exit condition has not been satisfied ("No" path of block 618), the application normalizes the received sets of model parameters (block 620). The application distributes the normalized model parameters to the nodes in the cluster (block 622). The application optionally adjusts the base model based on the normalized model parameters (block 624). The application returns to block 616 and proceeds thereafter in the iteration.

Figure 6B:
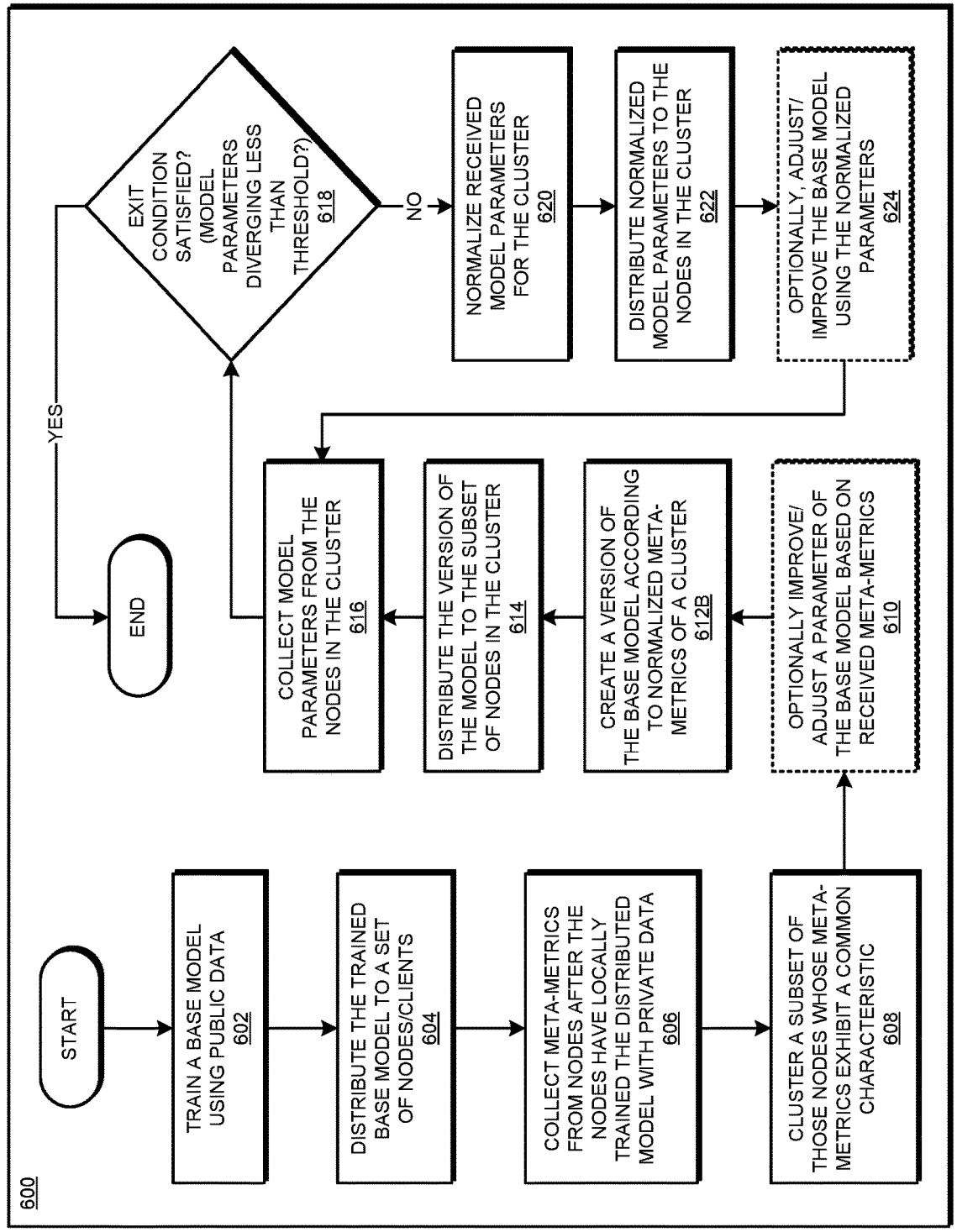
FIG. 6B depicts a flowchart of an example process for transfer learning without local data export using the cluster model method in accordance with an illustrative embodiment.

With reference to FIG. 6B, this figure depicts a flowchart of an example process for transfer learning without local data export using the cluster model method in accordance with an illustrative embodiment. Process 600 can be implemented using application 402 in FIG. 4.

The application trains a base model with public data (block 602). The application distributes the trained base model to a set of nodes (block 604). The application collects meta-metrics from the nodes after the nodes have locally trained the distributed base model with local data of the nodes (block 606).

The application clusters a subset of those nodes whose meta-metrics exhibit a common characteristic (block 608). The application optionally adjusts the base model based on the meta-metrics as described herein (block 610).

The application creates a version of the base model for a cluster according to the normalized meta-metrics of the cluster (block 612B). The application distributes the cluster model to the subset of nodes in the cluster (block 614).

The application collects sets of model parameters from the nodes in the cluster (block 616). The application determines whether an exit condition has been satisfied, e.g., whether the model parameters from the nodes in the cluster have converged within a tolerance (block 618). If the exit condition has been satisfied ("Yes" path of block 618), the application ends process 600 thereafter.

If the exit condition has not been satisfied ("No" path of block 618), the application normalizes the received sets of model parameters (block 620). The application distributes the normalized model parameters to the nodes in the cluster (block 622). The application optionally adjusts the base model based on the normalized model parameters (block 624). The application returns to block 616 and proceeds thereafter in the iteration.

Thus, a computer implemented method, system or apparatus, and computer program product are provided in the illustrative embodiments for transfer learning without local data export and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   distributing a trained base model to a set of nodes;
   collecting from a first node in the set of nodes, a first set of meta-metrics resulting from a transfer learning operation on the trained base model at the first node, the transfer learning at the first node using first local data available at the first node;
   clustering, in a cluster, the first node with a second node from the set of nodes, responsive to a meta-metric in the first set of meta-metrics being within a tolerance value of a corresponding meta-metric in a second set of meta-metrics collected from the second node;
   constructing a normalized set of model parameters after an iteration of one of (i)transfer learning and (ii) local training at the first node and the second node;
   distributing the normalized set of model parameters to the first node and the second node in the cluster.

2. The method of claim 1, further comprising:
   receiving a revised first set of model parameters from the first node;
   receiving a revised second set of model parameters from the second node;
   concluding that the revised first set of model parameters has converged with the revised second set of model parameters within a convergence tolerance; and omitting the distributing of the normalized set of model parameters for another iteration of one of (i)transfer learning and (ii) local training at the first node and the second node.

3. The method of claim 1, further comprising:
collecting, from the first node a first set of model parameters resulting from the iterative transfer learning operation on the normalized cluster model at the first node, the iterative transfer learning at the first node using the first local data available at the first node;
collecting, from the second node a second set of model parameters resulting from the iterative transfer learning operation on the normalized cluster model at the second node, the iterative transfer learning at the second node using the second local data available at the second node; and
normalizing, as a part of constructing the normalized set of model parameters, the first set of model parameters and the second set of model parameters.

4. The method of claim 1, further comprising:
informing the first node that the first node has been made a member of the cluster; and
informing the second node that the second node has been made a member of the cluster.

5. The method of claim 1, further comprising:
distributing, responsive to the clustering, a normalized cluster model to the first node and the second node, wherein the constructing of the normalized set of model parameters after an iteration of transfer learning is performed on the normalized cluster model at the first node and the second node.

6. The method of claim 5, further comprising:
computing a normalized set of model parameters for the cluster model; and
distributing the normalized set of model parameters to the first node and the second node as a part of distributing the normalized cluster model.

7. The method of claim 5, further comprising:
causing, responsive to the distributing the normalized cluster model, the first node to perform the transfer learning operation at the first node using local data of the first node; and
causing, responsive to the distributing the normalized cluster model, the second node to perform the transfer learning operation at the second node using local data of the second node.

8. The method of claim 1, wherein the first meta-metric comprises a probability distribution of an input in the first local data.

9. The method of claim 1, wherein the transfer learning at the first node produces a first personalized model, and wherein the first meta-metric comprises a difference between a value in first personalized model and a corresponding value in the trained base model.

10. The method of claim 9, wherein the value in first personalized model is a first constant used in function in the first personalized model and the value in trained base model is a base constant used in the function in the trained base model.

11. The method of claim 9, wherein the value in first personalized model is a probability distribution in an input to the first personalized model and the value in trained base model is a probability distribution in an input to the trained base model.

12. The method of claim 1, further comprising:
training a base model using public data, the training forming the trained base model, and wherein the public data excludes any local data available at any node in the set of nodes.

13. The method of claim 12, wherein the training is performed in a model training system configured separately from the set of nodes.

14. The method of claim 1, further comprising:
causing, responsive to the distributing the trained base model, the first node to perform the transfer learning operation at the first node using local data of the first node; and
causing, responsive to the distributing the trained base model, the second node to perform the transfer learning operation at the second node using local data of the second node.

15. A computer usable program product comprising a computer-readable storage device, and program instructions stored on the storage device, the stored program instructions comprising:
program instructions to distribute a trained base model to a set of nodes;
program instructions to collect from a first node in the set of nodes, a first set of meta-metrics resulting from a transfer learning operation on the trained base model at the first node, the transfer learning at the first node using first local data available at the first node;
program instructions to cluster, in a cluster, the first node with a second node from the set of nodes, responsive to a meta-metric in the first set of meta-metrics being within a tolerance value of a corresponding meta-metric in a second set of meta-metrics collected from the second node;
program instructions to construct a normalized set of model parameters after an iteration of one of (i)transfer learning and (ii) local training at the first node and the second node;
program instructions to distribute the normalized set of model parameters to the first node and the second node in the cluster.

16. The computer usable program product of claim 15, further comprising:
program instructions to receive a revised first set of model parameters from the first node;
program instructions to receive a revised second set of model parameters from the second node;
program instructions to conclude that the revised first set of model parameters has converged with the revised second set of model parameters within a convergence tolerance; and
program instructions to omit the program instructions to distribute the normalized set of model parameters for another iteration of transfer learning at the first node and the second node.

17. The computer usable program product of claim 15, further comprising:
program instructions to collect, from the first node a first set of model parameters resulting from the iterative transfer learning operation on the normalized cluster model at the first node, the iterative transfer learning at the first node using the first local data available at the first node;
program instructions to collect, from the second node a second set of model parameters resulting from the iterative transfer learning operation on the normalized cluster model at the second node, the iterative transfer learning at the second node using the second local data available at the second node; and program instructions to normalize, as a part of program instructions to construct the normalized set of model parameters, the first set of model parameters and the second set of model parameters.

18. The computer usable program product of claim 15, wherein the computer usable code is stored in a computer readable storage device in a data processing system, and wherein the computer usable code is transferred over a network from a remote data processing system.

19. The computer usable program product of claim 15, wherein the computer usable code is stored in a computer readable storage device in a server data processing system, and wherein the computer usable code is downloaded over a network to a remote data processing system for use in a computer readable storage device associated with the remote data processing system.

20. A computer system comprising a processor, a computer-readable memory, and a computer-readable storage device, and program instructions stored on the storage device for execution by the processor via the memory, the stored program instructions comprising:

program instructions to distribute a trained base model to a set of nodes;

program instructions to collect from a first node in the set of nodes, a first set of meta-metrics resulting from a transfer learning operation on the trained base model at the first node, the transfer learning at the first node using first local data available at the first node;

program instructions to cluster, in a cluster, the first node with a second node from the set of nodes, responsive to a meta-metric in the first set of meta-metrics being within a tolerance value of a corresponding meta-metric in a second set of meta-metrics collected from the second node;

program instructions to construct a normalized set of model parameters after an iteration of one of (i)transfer learning and (ii) local training at the first node and the second node;

program instructions to distribute the normalized set of model parameters to the first node and the second node in the cluster.

* * * * *